United States Patent [19]

Baker

[11] 3,736,521

[45] May 29, 1973

[54] MOS AMPLIFIER UTILIZING PARASITIC CONDUCTION STATE OPERATION

[75] Inventor: Lamar T. Baker, West Islip, Long Island, N.Y.

[73] Assignee: General Instrument Corporation, Newark, N.J.

[22] Filed: June 2, 1971

[21] Appl. No.: 149,332

Related U.S. Application Data

[62] Division of Ser. No. 31,490, April 24, 1970, Pat. No. 3,656,119.

[52] U.S. Cl. .....330/35, 307/205
[51] Int. Cl. .....H03f 3/16
[58] Field of Search .....330/35; 307/205, 307/304

[56] References Cited

UNITED STATES PATENTS

| | | | |
|---|---|---|---|
| 3,575,614 | 4/1971 | Policinghorn | 307/304 X |
| 3,581,292 | 5/1971 | Policinghorn | 307/304 X |

*Primary Examiner*—Roy Lake
*Assistant Examiner*—James B. Mullins
*Attorney*—James and Franklin

[57] ABSTRACT

An amplifier suitable for use in an MOS-type memory array in which practical use is made of the usually undesirable parasitic PNP transistor action of an MOS circuit.

3 Claims, 10 Drawing Figures

Patented May 29, 1973

3,736,521

2 Sheets-Sheet 1

MOS AMPLIFIER UTILIZING PARASITIC CONDUCTION STATE OPERATION

This application is a division of my application Ser. No. 31,490, filed Apr. 24, 1970 now U.S. Pat. No. 3,656,119 entitled "Memory Utilizing the Non-Linear Input Capacitance of an MOS Device" and assigned to the assignee of this application.

The present invention relates generally to memories, and more particularly to binary memories of the type fabricated according to MOS (metal-oxide-semiconductor) techniques.

Recent achievements in LSI techniques by means of which complex circuitry is implemented in remarkably small volumes, has been primarily a result of corresponding developments of MOS fabrication processes. The MOS process permits the simultaneous implementation of a great number of interconnected semiconductor devices at extremely high densities on one or more chips of semiconductor material, to create a circuit capable of performing a predetermined operation. As a result of this capacity for high density packaging, MOS circuits have found widespread acceptance in binary logic and related systems.

The basic logic element formed in an MOS fabrication process is the field effect transistor (FET) in which source and drain regions of a similar conductivity type are created as by diffusion in a semiconductor substrate. The source and drain regions are separated by a channel, and a gate electrode is insulated from the source and drain regions by an insulating oxide film. When a suitable voltage exceeding a threshold value is applied to the gate, the channel becomes inverted, causing conduction to occur in the channel between the source and drain regions.

It is known to employ FETs in binary memories such as the data storing elements, in the memory addressing circuitry, and in data signal amplifiers. In a typical MOS memory, the data storing elements are commonly the equivalent capacitances defined between either the source or drain regions and the grounded substrate.

The difficulty in the known MOS memories results from the tendency of the stored data signal to leak from the data storing capacitance. To prevent the loss of the stored data signal resulting from this leakage, it has been required in most MOS memories to, in some manner, periodically update or refresh the stored data signals. The additional circuitry required for data refreshing adds significantly to the complexity of the memory and reduces the possible maximum density of the memory elements.

Another basic section of a binary memory is the address select circuitry which selects the address location in the memory from which stored data is to be read out, and/or in which new data is to be written. Those circuits conventionally receive and decode address signals to produce row and column select signals at a unique sense (e.g., negative), the selection of a row and a column in this manner serving to define the selected memory address. To achieve unambiguous address selection, it is highly desirable that the address select signal be at a maximum amplitude at that unique sense.

In the fabrication of an MOS circuit including FETs, each FET defines a potentially active parasitic PNP transistor with the P-type source and drain respectively defining the equivalent emitter and collector, and the substrate (usually at ground) defining the equivalent base. In the event that the emitter becomes forward-biased with respect to the base-substrate, unwanted parasitic conduction occurs between the source-emitter and drain-collector of the equivalent PNP transistor.

Heretofore, such parasitic PNP transistor operation has been considered to be highly undesirable, and accordingly much effort and thought in the design of these circuits has been expended in the prevention of this effect. Such measures include the provision of additional P-type regions formed in the substrate to define guard bands which prevent the unwanted forward-biasing and hence the parasitic conduction of the device.

It is an object of the present invention to provide an MOS memory data storing element having an increased data storage time.

It is another object of the invention to provide an MOS memory in which the non-linear input capacitance of an MOS device is utilized as the data storing element.

It is a further object of the invention to provide an improved MOS memory in which the requirement for data refreshing is significantly reduced.

It is yet another object of the invention to provide an MOS circuit in which an augmented node signal is produced at a desired polarity without increasing the magnitude of the voltage source to the circuit.

It is still another object of the invention to provide an MOS memory addressing circuit in which the non-linear input capacitance of an MOS device is employed to increase the level of an addressing signal developed at a signal node.

It is yet another object of the invention to provide a memory amplifier in which use is made of the usually undesirable parasitic conduction phenomenon of a circuit fabricated by an MOS process.

In the memory circuit of the present invention, the memory storing element is defined by the non-linear input capacitance of an MOS device. The source and drain regions of the device are biased with respect to the substrate and the stored data signal level at the gate is established at a sufficient level to ensure that the channel is highly inverted. Under these conditions the relationship between the level of the stored data signal and the input gate-to-channel capacitance is such as to tend to keep the stored data voltage constant as the stored data signal charge leaks from that capacitance. That is, as the charge decreases, tending to decrease the stored data voltage, the input data storage capacitance also decreases, thereby tending to maintain the stored data signal voltage at a constant level. As a result, the data storage time of the memory is significantly increased.

In another aspect of the invention, the non-linear input gate-channel capacitance of the FET is utilized to increase the amount of signal feedthrough to a data node upon the inversion of the channel of an MOS device, the inversion of the channel having been initially caused by a first signal level established at the gate. A voltage applied to the source and drain of the device is thereby fed to the node through the augmented gate-to-channel capacitance, to thereby augment the signal at the node at a desired sense.

Also disclosed is a novel two-device memory in which the use of an MOS device as a selective feedthrough device and as a memory storage capacitor are both utilized.

In yet another aspect of the invention, an MOS device is purposefully utilized as a PNP lateral transistor circuit. That phenomenon, usually considered undesirable in MOS circuits, is described herein as employed in a memory data read out amplifier.

To the accomplishment of the above, and to such further objects as may hereinafter appear, the present invention relates to improvements in MOS memories, substantially as defined in the appended claims, and as described in the following specification taken together with the accompanying drawings in which:

FIG. 1 is a schematic diagram of a memory storing element of an MOS memory illustrating features of the present invention;

FIG. 2 graphically illustrates the relationship between the input capacitance of the memory storing device of FIG. 1 and the level of the stored data signal for various values of the source biasing voltage;

FIG. 3 is a schematic diagram of a circuit for establishing a signal voltage at a node in which use is made of the non-linear input capacitance of the MOS device;

FIG. **4*a*** is an equivalent circuit of one of the FETs of the circuit of FIG. 3 in the condition in which the voltage at the node is 0 volts;

FIG. **4*b*** is a similar equivalent circuit or the condition in which the node signal voltage is negative;

Figures 1, 2, 3, 4A, 4B, 9:
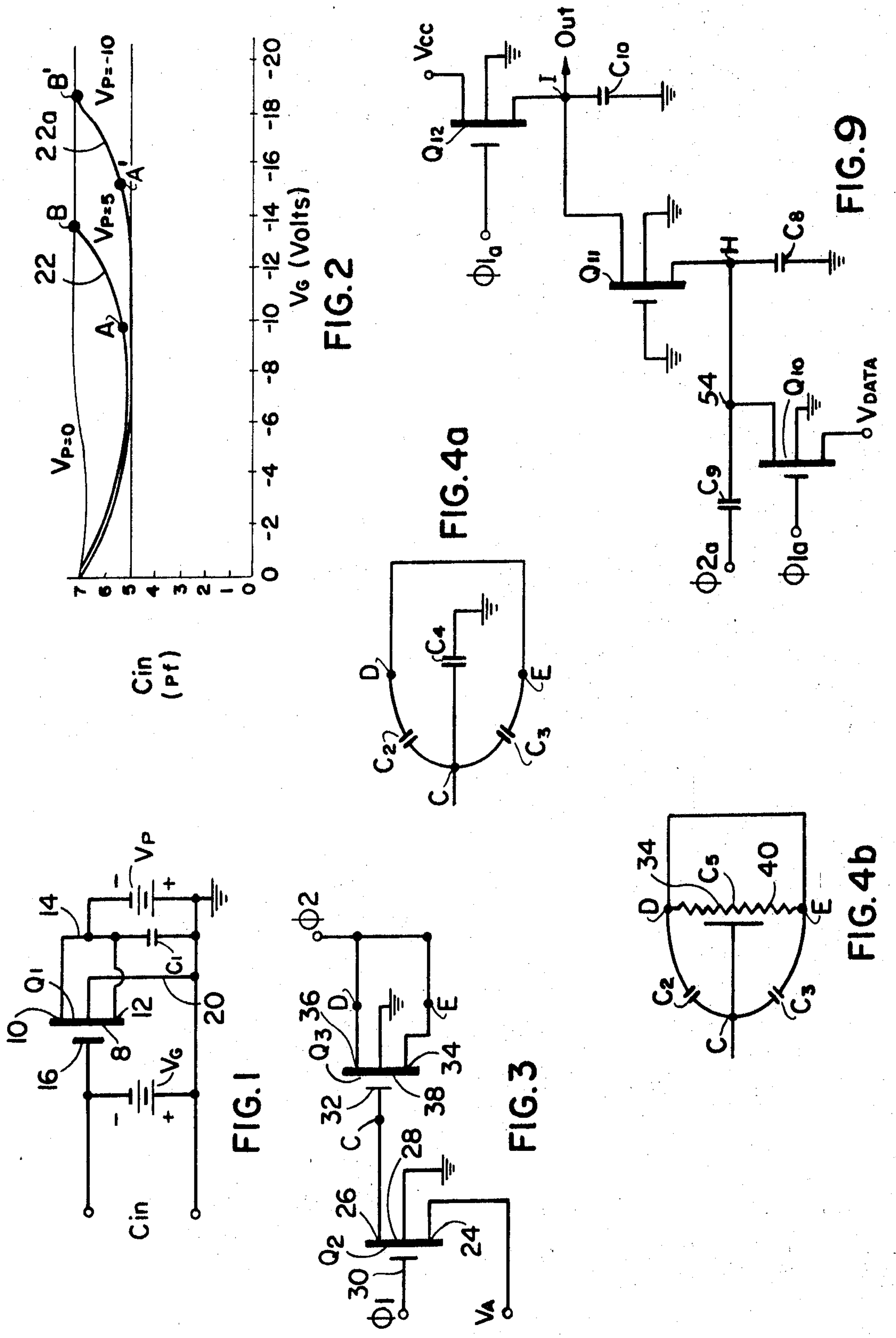
FIG. 9 is a schematic diagram illustrating the use of an MOS device as a lateral PNP transistor taking advantage of the parasitic conduction phenomenon.

The memory circuit illustrated in FIG. 1 makes use of the phenomena that has been found in MOS devices that the relationship between the input capacitance and gate voltage is non-linear for specified conditions of the device.

The input capacitance of the FET can be considered as being divided into three distinct components: the capacitance between the gate and drain, the capacitance between the gate and source, and the capacitance between the gate and the channel. The first two capacitance components can be considered as being substantially constant. The gate-to-channel capacitance, however, has been found to vary considerably as a function of the applied voltage between the gate and substrate. A model showing the reason for the decrease of the gate-to-channel capacitance with increasing gate voltage would consist of two capacitors connected in series, one capacitor representing the gate-to-inverted channel capacitance, and the other capacitor representing the inverted channel-to-substrate capacitance. The equivalent gate-to-substrate capacitance is thus less than the smaller of the two component series connected capacitances.

At a zero gate-to-substrate voltage for a P-type FET in which the substrate is of N-type plurality, the channel is not inverted and the input capacitance is only the gate-to-substrate capacitance which is then at a maximum value. As the gate-to-substrate voltage is increased negatively beyond the threshold level, the channel becomes inverted and two serial capacitances are effectively formed which define the equivalent input or gate-to-substrate capacitance which is then at a minimum level. As the negative gate-to-substrate voltage is further increased, the inverted surface of the substrate in the channel region becomes electrically connected to the drain and source regions as a result of the decreasing resistance in the inverted channel. At this time there is no capacitance between the gate and substrate, but only between the gate and drain, channel and source which are electrically connected. At this time the gate capacitance is again at its maximum value.

A memory circuit making use of the non-linear capacitance phenomena is illustrated in FIG. 1 in which an FET Q1 has a drain 10 and a source 12 electrically connected to one another by a conductor 14, and a gate 16. The substrate indicated at 18 is connected to ground by a conductor 20. The drain and source are biased negative with respect to the substrate by a voltage $V_p$ and an a.c. bypass capacitor C1 is present between the source and drain and the substrate. A data signal applied between the gate and substrate is represented as a voltage $V_G$. That voltage is sufficiently negative so that the channel of FET Q1 is highly inverted.

FIG. 2 graphically illustrates the relationship between the input capacitance C1 between the gate and substrate of FET Q1, and the level of the negative data signal $V_G$ for three different values of the source and drain bias voltage $V_P$. It will be noted that when $V_P =$ 0 the input capacitance remains substantially constant at a level of approximately 7pf for all values of $V_G$. However, when $V_P$ is −5 volts, the input capacitance $C_{in}$, for values of $V_G$ between approximately −9 volts and −13 volts varies between points A and B, between 5 and 7 pf. When $V_P$ is increased to −10 volts, the input capacitance is variable between 5 and 7 pf between points A′ and B′ when $V_G$ varies between approximately −14.5 volts and −18 volts. Thus, when the channel of FET Q1 is inverted by a sufficiently negative gate voltage and the drain and source are negatively biased with respect to the substrate, the input gate-to-substrate capacitance is variable for certain values of the gate voltage. The memory storage element of the invention is based on this operating characteristic of an MOS device.

In the operation of the storage element of the invention the data signal is stored on the input gate capacitance as a negative signal which places the channel in its inverted state in the region in which the input capacitance-gate voltage curve is at or near its non-linear region, i.e., that region between points A and B in FIG. 2. As the stored data signal begins to leak off from the gate capacitance, as it may in an MOS storage element, the data voltage tends to become reduced accordingly. However, within the non-linear capacitance region 22, as the value of the data signal $V_G$ tends to reduce so does the storage capacitance $C_{in}$. However, and significantly, the ratio of the reduced charge to the reduced capacitance, which defines the data storage voltage, tends to remain substantially constant over the range of non-linearity. In other words as the charge on the input data storage capacitor tends to decrease or leak off, the data storage voltage defined as the ratio of that charge to the input capacitance tends to remain constant or at least to decrease at a lower rate so as to exceed the threshold value of FET Q1 for an increased period to time, as compared to the conventional data storing elements in MOS memories. When the stored data charge is further reduced so that the input capacitance is again in its linear region at a reduced value (point A), the data signal voltage will then fall off at a greater rate.

As can be seen in FIG. 2, as the negative value of $V_P$ is increased, the non-linear capacitance region is moved to the right to region 22*a*. This condition is desirable when there is a corresponding increase in $V_G$ to −18 volts so that the initial loss of charge will occur when the input capacitance is in its non-linear operating region. The bias value of the source and drain is selected in accordance with the range of data signal voltages utilized in the storing of data. The data storing element of FIG. 1 thus has the highly desirable effect of maintaining its data storage signal at a sufficiently high level exceeding the device threshold levels for a longer period of time than was heretofore possible in MOS memories.

FIG. 3 illustrates an MOS circuit which utilizes the non-linear input capacitance phenomena described above to produce at a node C an augmented voltage at a desired polarity which is here shown as being negative. A circuit of this type may be used, for example, in a memory addressing circuit to produce a unique negative row and column select signal for addressing the selected address in the memory. As shown that circuit comprises a first FET Q2 having a source 24 and a drain 26. The substrate 28 is connected to ground. The gate 30 of FET Q2 receives a clock signal $\phi$1 which is a repeating clock pulse having a negative portion which defines the time of that clock. The drain of FET Q2 receives a address select voltage $V_A$ which represents a signal which may be selectively at one of two levels depending on the input addressing information to the circuit. Node C is connected to the source of FET Q2 and to the gate 32 of a second FET Q3. The source 34 and drain 36 of FET Q3 are tied together and receive a second repeating clock $\phi$2 which is negative after clock $\phi$1 has returned to ground level. The substrate 38 of FET Q3 is connected to ground.

In the following description of the circuit of FIG. 3, $V_A$ will be assumed to be either at 0 or −12 volts, the latter value corresponding to a selected row or column, and clocks $\phi$1 and $\phi$2 vary between ground and −17 volts during their respective times. During $\phi$1 times, that is when the gate of FET Q2 is negative, conduction between the source and drain of FET Q2 occurs. When $V_A$ is at 0 volts, node C is thus charged to 0 volts through the source-drain circuit of FET Q2. For this condition at node C, the channel of FET Q3 is not inverted and the equivalent circuit of FET Q3 is that as shown in FIG. 4*a* in which capacitors C2, C3 and C4 are respectively the gate-to-drain capacitance, gate-to-source capacitance, and the gate-to-substrate capacitance.

When, however, $V_A$ is −12 volts, node C is charged to that level during $\phi$1 time and causes the channel of FET Q3 to become highly inverted. During $\phi$2 time, that is when the $\phi$2 clock is negative, the input capacitance of FET Q3 is non-linear as described above, and feedthrough of the negative $\phi$2 clock will take place through this capacitance to node C to thereby increase the negative level at that node as desired. The equivalent circuit for the inverted channel condition of FET Q3 is illustrated in FIG. 4*b* in which the inverted channel is indicated as 40, and the gate-to-channel capacitance is designated C5. As described above, it is the latter capacitance that provides the feedthrough of the negative signal to node C whenever FET Q3 is operated in a condition to establish a non-linear input capacitance, to wit, when its channel is inverted by the negative voltage initially applied at node C during $\phi$1 time.

Figure 6:
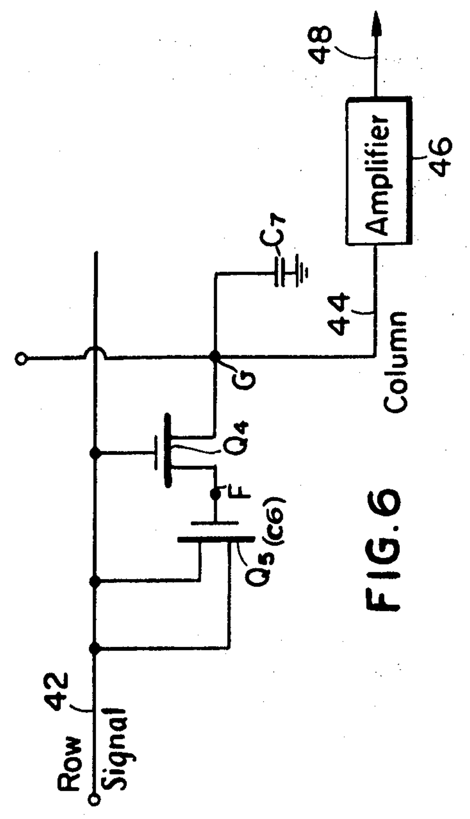
FIG. 6 is a schematic diagram of a two-device memory cell in which the principles of the invention are employed.

The operation of the MOS FET device as a memory capacitor (FIGS. 1 and 2) and as a selective feedthrough capacitor (FIGS. 3 and 4) are both utilized in the novel two-device memory cell schematically illustrated in FIG. 6. However, before proceeding to a description of that memory cell it is believed to be useful to first briefly examine the conventional one-device, one-capacitor memory cell illustrated in FIG. 5.

In the conventional memory cell the memory storing element comprises a data storing capacitor C6 connected between the drain of an FET device Q4 and ground. A data-storing node F is defined between the ungrounded terminal of the data-storing capacitor and the drain of FET Q4. The gate of FET Q4 is connected to a row line 42, and the source of that device is connected to a node G defined on a column line 44. An equivalent column capacitance designated C7 is established between column line 44 and ground. Node G is also connected to the input of a data signal amplifier 46 having an output connected to a data output node 48.

Briefly, in operation, data is stored at data node F at one of two levels (e.g., zero and negative) corresponding to the logic "0" and "1" data signals. When the memory cell is addressed as for a read out operation, row line 42, which is normally at zero volts, is charged negative, and the stored signal at data node F is transferred through the drain-source output circuit of FET Q4, which is at that time rendered conductive, to column node G. That signal is then amplified in amplifier 46 and appears at node 48 as either a 0 or 1 signal.

Figure 5:
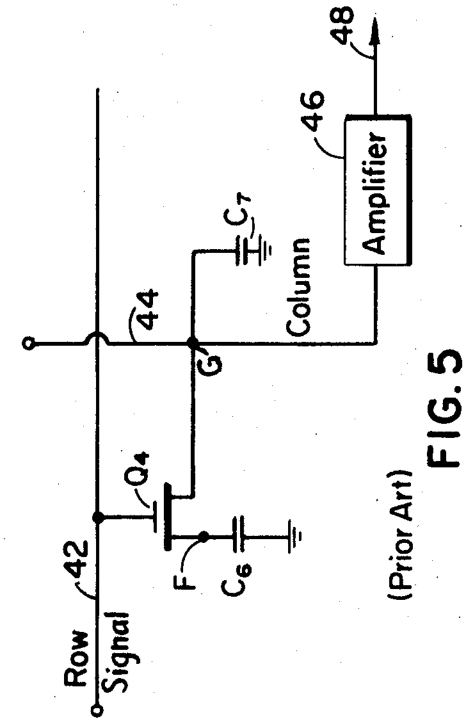
FIG. 5 (Prior Art)
FIG. 5 is a schematic diagram of a conventional one-device and one-capacitor memory cell.

For proper operation of the circuit of FIG. 5, the data storing capacitor C6 must be significantly larger than column capacitor C7, so that when FET Q4 is turned on there will be a sufficient change in the voltage level on column line 44 to be sensed by amplifier 46 when the data stored at node F is negative. Moreover, the read out operation causes a decrease in the stored negative charge on capacitor C6 which must be quickly restored or refreshed if the data is to be available for a subsequent read out operation at that memory cell.

In the improved memory circuit of FIG. 6, in which those elements and nodes that correspond to the elements in the circuit of FIG. 5 are designated by corresponding reference numerals and letters, the data storing capacitor C6 is replaced by a second MOS FET Q5 which is operated along the lines described with reference to the memory capacitor of FIG. 1. The gate of FET Q5 is connected to data node F and the source and drain of that device are both connected to row line 42.

The equivalent data storing capacitor (C6) is thus defined by the input capacitance of FET Q5 with the gate of that device defining one equivalent capacitor terminal, and the drain and source of that device defining the other equivalent capacitor terminal.

When the memory cell of FIG. 5 is not addressed that is, when row line 42 is at zero potential with respect to the substrate, node F is electrically disconnected from node G, thereby allowing the storage of negative charge on node F if a "1" is to be stored, and a zero charge for storing a "0." If zero charge is stored, the equivalent storage capacitor (C6) has a capacitance equal to its maximum value (see FIG. 2 with $VG=0$), insuring that it will tend to remain at that level. If a negative charge is stored on the capacitor such that node F is sufficiently negative to invert the channel of FET Q5, the input capacitance of FET Q5 is again equal to its maximum possible value (see FIG. 2 with $VP=0$ and $VG>|-8v|$) thereby insuring maximum storage period for the negative charge for the reasons set forth above.

When the memory cell is addressed (the row select signal at line 42 transitions from zero potential to a negative potential sufficiently negative to turn FET Q4 on) FET Q5 acts not only as a "memory storage" capacitor, but also as a "selective feed through" capacitor along the lines described in FIGS. 3 and 4.

At those memory cells in the complete memory in which zero charge is being stored, the storage capacitor is formed primarily of the capacitance from node F to the substrate, since the channel of FET Q5 at those cells is not inverted (see the equivalent circuit of FIG. 3 at FIG. 4*a* with $VA = 0$). The capacitance from node F to the transitioning row line is at a minimum, consisting only of the gate-to-source and gate-to-drain overlap capacitances. When zero charge is stored on node F, therefore, the transitioning row line does not cause it to go significantly more negative so that when FET Q4 is turned on, thereby connecting nodes F and G, node G will remain in its initially charged state (zero potential) and a "0" will be read out of the selected column at node 48.

At those memory cells connected in which negative charge is being stored, the storage capacitor is formed primarily of the capacitance from node F to the row line, since the channel of FET Q5 is in this situation inverted (see the equivalent circuit of FIG. 3 at FIG. 4*b* when $V_A$ is −12 volts). The negative transitioning row line, therefore, tends to feed through to those data nodes (node F) on which negative charge is stored. Thus, when a negative ("1") charge is stored on node F, the transitioning row line causes that node to become more negative as a result of the feedthrough so that when FET Q4 is turned on (when the row line becomes sufficiently negative) to thereby connect nodes F and G, node G is made to move negative not only due to the redistribution of charge between the two nodes, but also due to the increased feedthrough of the negative row line signal to node F. The increased negative charge at node G will be read out as a logic "1" signal at node 48.

Thus in the circuit of FIG. 6, as the row signal is made negative, turning on FET Q4 and causing the transfer of charge from node F to node G, an apparent "refreshing" action of the stored data signal at node F takes place. This can be explained as follows:

As the row signal on row line 42 moves in the negative direction, charge is added to node F through the non-linear MOS capacitor defined by FET Q5, because of the capacitance feedthrough from row line 42 to node F. It should be noted that this action is maximum only when node F is already negative, that is, storing a logic "1" signal causing the channel of FET Q5 to be inverted and the equivalent memory capacitance (C6) to be at its maximum value of capacitance as described above.

During the transient time, that is, the time when the row signal and nodes F and G are changing their potentials to capacitor C7, the fact that node F, which is one terminal of capacitor (C6) and row line 42, which is the other terminal of that capacitor, are moving in opposite directions causes the effective value of capacitor (C6) to be many times larger than its geometric value as a result of the Miller effect.

Thus, the negative voltage applied to row line 42 for purposes of memory cell selection also serves to refresh the negative signal stored at node F.

In the two-device memory cell of FIG. 6 the maximum negative voltage that can be applied at nodes F and G can be no more negative than a threshold drop more positive than the row select signal at the selected row line 42, in order to permit FET Q4 to be conductive when row line 42 goes negative. As a result, the capacitance (C6) established at data storing node F by FET Q5 is at its minimum value (see FIG. 2). Consequently since charge is equal to the product of capacitance and voltage, a data signal write-in operation at the selected memory cell produces a minimum amount of charge "written" into the memory storing capacitance.

Figure 7:
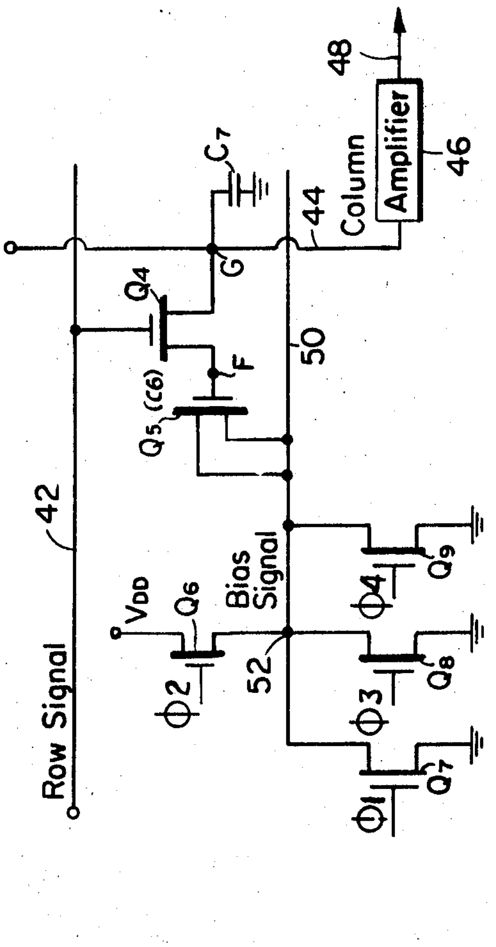
FIG. 7 is a schematic diagram of an alternative two-device memory cell employing the principles of the invention.

In memory applications in which an increased charge must be stored in a write-in operation, the modified two-device memory cell illustrated schematically in FIG. 7 is preferably utilized. In FIG. 7, elements corresponding to those in FIGS. 5 and 6 are identified by corresponding reference numerals and letters.

In the memory cell of FIG. 7 the source and drains of FET Q5 rather than being connected to row line 42 are instead both connected to a bias line 50. An FET Q6 has its drain-source output circuit connected between a negative voltage supply $V_{DD}$ and a point 52 defined on line 50. FETs Q7, Q8 and Q9 have their output circuits connected between point 52 and ground. FETs Q6–Q9 respectively receive the $\phi$2, $\phi$1, $\phi$3 and $\phi$4 clocks at their gates and are respectively rendered conductive when those clocks are in their negative periods.

Figure 8:
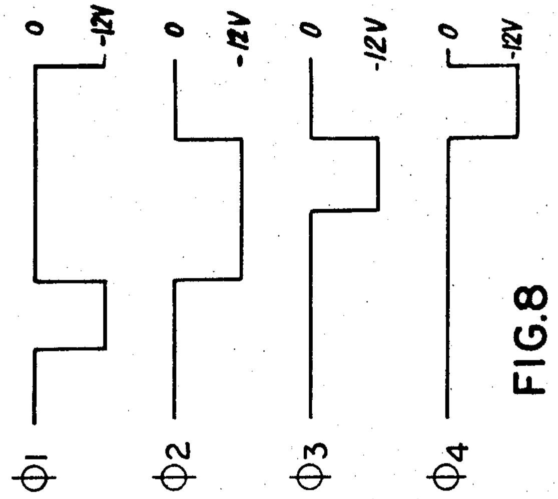
FIG. 8 is a waveform diagram of the clock signals used in the operation of the memory cell of FIG. 7.

As seen in the clock waveform diagram of FIG. 8, the $\phi$2 clock overlaps the $\phi$3 clock, that is, in the second half of the $\phi$2 clock negative period, the $\phi$3 clock is also negative, and as a result, FETs Q6 and Q8 are both conductive during the clock overlap period. However, the resistance of FET Q8 is designed to be significantly less than that of FET Q6, so that during the first half of the $\phi$2 period, point 52 is charged to $V_{DD}$ while during the $\phi$2–$\phi$3 overlapping period point 52 is substantially at ground. During the $\phi$1 and $\phi$4 periods FETs Q7 and Q9 are respectively conductive and FET Q6 is nonconductive, so that point 52 is at these times at ground.

Thus during the first half of the $\phi$2 clock, during which a read-out operation is performed from the addressed memory cell, point 52 and the source and drain of FET Q5 are biased negative, the input capacitance of FET Q5 (C6) is at its minimum, and the memory cell operates substantially in the same manner as the memory cell of FIG. 6, in which the data storing capacitance is a non-linear function of the gate voltage and the negative signal on line 50 is fed through FET Q5 to node F.

However, during the $\phi$3 clock period, during which a data write-in operation is performed at the addressed memory cell, point 52 and the source and drain of FET Q5 are at ground potential. As a result the data storing capacitance (C6) is at a maximum value only during the write-in period ($\phi3$) and operates in its non-linear portion of its capacitance-voltage curve during the read-out period ($\phi2$–$\overline{\phi3}$) as desired for optimum memory operation.

In a memory in which a plurality of memory cells of the type illustrated in FIG. 7 are arranged at the intersection of a plurality of row and column lines, the bias signal at line 50 is common to all cells in the memory, that is, it is applied during the $\phi3$ period to the unaddressed as well as to the addressed memory cells.

The circuit illustrated in FIG. 9 makes use of the heretofore considered undesirable parasitic PNP transistor action to serve as the amplifier portion of an MOS memory. That circuit contains a data storage node H having an equivalent data storage capacitance C8 connected between it and ground. Node H is also connected to a point 54 which in turn is connected to the drain of a FET Q10. The gate of that device receives the $\phi1a$ clock and its source is connected through an input capacitor C9 to a source of a second clock pulse $\phi2a$.

Node H is also connected to the source of FET Q11 which is purposely operated in its parasitic conduction state to define a PNP transistor. The drain of that device is connected to an output node I and its gate is connected to ground. The source of FET Q11 defines the emitter, the drain of that device defines the collector, and the grounded substrate defines the base of the equivalent parasitic PNP transistor.

Output node I has an output capacitance C10 defined between it and ground and is connected to the source of FET Q8 whose gate receives the $\phi1a$ clock. The drain of FET Q12 is connected to a voltage source $V_{CC}$ at −17 volts. In the operation of the circuit of FIG. 9, node H is charged during $\phi1a$ time to the level of $V_{DATA}$ since FET Q10 is caused to be conductive at that time. Similarly output node I is charged to a negative voltage through the conducting source-drain circuit of FET Q12 during $\phi1a$ time during which time that device is conductive.

For a logic "0" signal $V_{DATA}$ is assumed to be zero volts, so that a signal of zero volts is applied to node H through FET Q10 during $\phi1a$ time. The feedthrough from the positive edge of the $\phi2a$ clock, which overlaps and extends beyond the $\phi1a$ clock, through input capacitor C9 causes node H to become positive, and thus causes the emitter of the equivalent PNP transistor to become forward biased with respect to the grounded base of that transistor. As a result of this forward bias condition of FET Q11, collector current flows in the resulting PNP transistor and into the output capacitor C10. This in turn reduces the negative voltage initially stored on that capacitor during $\phi1a$ time and causes the voltage at output node I to be approximately 2 volts less negative than its initially charged level, that is, a level one threshold greater than the $\phi1a$ clock. On the other hand if the data signal were −3 volts corresponding to a logic "1" signal, node H would be charged to that level during $\phi1a$ time. The feedthrough of the $\phi2a$ clock through the capacitor C9 to node H would cause node H to move from −3 volts to 0 volts during $\phi2a$ time. This level is, however, insufficient to forward bias the PNP transistor and thus that transistor will remain non-conductive and the voltage at output node I remains substantially at its initially charged negative level.

Thus, as desired, the output level at node I reflects and amplifies the logic sense of the input data signal. That is, an input data signal, $V_{DATA}$ of either 0 or −3 volts, that is, a logic "0" or logic "1" signal, is reflected in an output data signal at node I of either its initially charged voltage, or that voltage less the voltage drop in the conducting PNP transistor Q11, which voltage drop may be as much 10 volts or more. The increased swing at the output node in response to a lesser variation in the data signals is an effective amplification of the data signals. That amplification is achieved in the circuit of the invention by the use of the parasitic transistor action of FET Q11 in a manner heretofore considered to be undesirable in the operation of MOS circuits.

The present invention thus provides in an MOS memory an improved data storage element in which increased storage time is obtained without the use of additional data refreshing and restoring circuitry. Moreover, a circuit for producing a specified addressing signal at a node is described in which the addressing voltage at that node is charged to a higher level than had previously been obtainable by the use of equivalent voltage sources, thereby resulting in greater accuracy of memory addressing. The memory of the present invention thus has a greater storage capacity in a given volume as well as a reduced cost of fabrication as compared to comparable MOS memories type.

The present invention thus achieves the objects stated above in that it achieves improved memory circuit operation by the use of the non-linear input capacitance of an MOS device in a novel and useful manner, and also makes use of the heretofore undesirable parasitic conductance phenomenon in FET devices as a memory amplifier or the like in a novel and useful manner.

While several embodiments of the invention have been herein specifically described it will be apparent to those skilled in the art that variations may be made therein without departing from the spirit and scope of the invention.

I claim:

1. An amplifier such as for use as an MOS memory formed on a semiconductor substrate, said amplifier comprising a data node, data signal storing means coupled to said data node, means for selectively establishing a data signal at one of a first and a second signal level at said data signal storing means, an MOS device comprising source and drain regions respectively capable, when appropriately biased, of defining the collector and emitter of and equivalent PNP transistor, said substrate defining the base of said transistor, means for biasing said MOS device to operate in its parasitic conduction state to define a PNP transistor, an output node coupled to the collector of said transistor, the emitter of said transistor being coupled to said data signal storing means, and means for establishing an initial output signal at said output node, said data signal establishing means defining means for forward biasing siad transistor into conduction only when said data signal is at one of its said first and second levels, to thereby vary the output signal at said output node.

2. The amplifier of claim 1, further comprising a second MOS device having an output terminal coupled to said data node, a second output terminal receiving an input data signal at one of said first and second levels, and a control terminal receiving a clock signal, said second MOS device defining a switching device effective upon its actuation by said clock signal to apply said input data signal to said data signal storing means.

3. The amplifier of claim 2, further comprising means for periodically augmenting the signal level at said data node during a second clock period extending beyond the period of said first-mentioned clock signal.

* * * * *